United States Patent [19]

Davies

[11] 4,247,422

[45] Jan. 27, 1981

[54] METALLIC SUPPORTED CATALYTIC SYSTEM AND A METHOD OF MAKING IT

[75] Inventor: Richard G. Davies, Dearborn, Mich.

[73] Assignee: Ford Motor Company, Dearborn, Mich.

[21] Appl. No.: 9,332

[22] Filed: Mar. 26, 1979

[51] Int. Cl.³ .................. B01J 21/04; B01J 23/86
[52] U.S. Cl. ........................ 252/465; 252/472; 252/477 R; 423/213.5
[58] Field of Search ............. 252/465, 477 R, 472; 423/213.5

[56] References Cited

U.S. PATENT DOCUMENTS

| | | | |
|---|---|---|---|
| 3,397,154 | 8/1968 | Talsma | 252/463 |
| 3,907,708 | 9/1975 | Lacroix | 252/477 R |
| 3,920,583 | 11/1975 | Pugh | 252/465 |
| 4,096,095 | 6/1978 | Cairns | 252/465 |

*Primary Examiner*—W. J. Shine
*Attorney, Agent, or Firm*—Joseph W. Malleck; Olin B. Johnson

[57] ABSTRACT

A method of making and using a metallic supported catalytic system for automotive emission control is disclosed. A plain carbon steel foil is formed into a matrix having a plurality of aligned micropassages; forming is preferably carried out by corrugating one strip of foil and winding said corrugated strip along with one or more noncorrugated foil strips to create a honeycomb matrix. The formed matrix is then immersed in a hot lead bath containing alloying ingredients which displace iron atoms in said foil to provide diffusion alloying substantially throughout the entire thickness of said foil. The contact points between said foil strips are diffusion bonded to lock the entire matrix. The alloyed matrix is then heated to form an oxide film from at least one of the alloying ingredients. The bonded matrix is then coated with a refractory wash and with a catalytic ingredient. The entire coated and heat treated matrix is then placed in a suitable housing through which hot automotive emissions are directed with a predetermined pressure, flow pattern and chemical content for effecting fusion of the coatings and emission cleanup.

10 Claims, No Drawings

METALLIC SUPPORTED CATALYTIC SYSTEM AND A METHOD OF MAKING IT

BACKGROUND OF THE INVENTION

Catalytic systems for automotive emission control have usually been either of the loose bed type or of the structured support type. The loose bed type is often referred to as a non-supported catalyst because the catalytic ingredients are formed as discrete pellets grouped together in a bed forming a network of passages between such pellets. The loose bed of catalytic system has proved to be inefficient for automotive use because of the need for increased efficiency within a minimum space allotment.

The structured support type of catalytic system typically has a preformed unitized matrix upon which is deposited the catalytic chemicals. This type of system has proved somewhat more desirable in that the resistance to flow of exhaust gases therethrough can be reduced considerably by proper design of the matrix; the matrix can be constructed of a bundle of thin wires or ribbons, or fused plys of ceramic material interleaved in a predetermined pattern, or a cast ceramic honeycomb matrix. More importantly, the catalytic chemicals can be deposited thereon in a very thin layer reducing the employed catalytic amount and reducing the cost of construction.

Although ceramic matrices have been employed, they have suffered somewhat from the problems of being fragile and subject to breakage resulting from thermal expansion when utilized in a high temperature environment for a long period of time. Developmental efforts of the art has therefore turned to metallic supported catalyst systems to obtain greater efficiency, economy and durability for automotive catalytic systems. The problems encountered in the development of metallic supported catalyst systems are reviewed chronologically below.

The first problem encountered and overcome was the need for separation of the catalyst material from the metal substrate so that, under high temperature use, the catalyst material would not become inactive by thermal diffusion into the metallic substrate. The obvious approach to solve this problem was to interpose a layer of inert material (alumina or other ceramic) between the sheet substrate (usually alloy steel) and the exposed catalytic material (such as platinum); see further U.S. Pat. No. 3,437,605. Unfortunately, the deposited ceramic coating upon the steel substrate peeled and debonded during use, reducing catalytic function. The prior art attempted to solve this peeling problem by requiring that the catalytic material, itself, be one that would not become inactive by thermal diffusion. To this end, one approach was to promote a conversion coating of gamma alumina on the steel substrate. This was carried out by dipping the metallic substrate in an oxidizing acid (such as nitric acid) to dissolve iron; the substrate was then dipped in a metal hydroxide solution and thereafter dried and exposed to a hot oxygen environment to convert the aluminum hydroxide to gamma alumina. Unfortunately, with this system it was necessary to employ metal disc supports that were 0.35–0.45 millimeters thick and were required to be retained between screens without intimate bonding. This system suffered from lack of catalytic efficiency and economy of manufacture. (See U.S. Pat. No. 3,711,856).

Another approach to selecting a catalyst which would not be inactivated by thermal diffusion was to employ monel metal (Ni-Cu) bonded to stainless steel; the intimately bonded pieces were used as the total catalytic system. Stainless steel, unfortunately, could only be supplied in a thickness above 0.03 inches which prevented good flow efficiency (see U.S. Pat. No. 3,733,894).

To advance the prior art further, it was next suggested that successive layers be employed with the final layer being an optimum rare earth type catalytic material, such as platinum. This, of course, required some attention to providing better adherency between the layers of the system and also to increasing the surface area supporting the platinum coating for increased efficiency. One approach by the prior art, in accordance with this concept, employed a stainless steel substrate, typically in the form of wire (the stainless steel having a composition of about 15% nickel and 22% chromium). The substrate was dipped in an aluminum silicate solution and then sprayed with a catalyst carrier material, such as aluminum hydroxide; the aluminum hydroxide was thereafter impregnated with the catalyst material, such as platinum. The total coated system was calcined at an appropriately high temperature to convert the silicates to an aluminum oxide-silicate mixture (see U.S. Pat. No. 3,891,575).

Another multi-layer approach was to coat a stainless steel substrate (0.1 mm thick) with aluminides (such as nickel aluminide) and spray alumina thereover; the coated system was then chemically activated by heating at 500° C. to produce a converted alumina coating. The alumina coated substrate was then dipped in a suitable solution containing platinum. The substrate pieces were not bonded, but rather mechanically held together in an envelope or held by fasteners; this limited the ability of the assembly to have low resistance to flow (see U.S. Pat. No. 3,907,708). Each of these approaches was not sufficiently satisfactory with respect to adhesion between layers and oxidation resistance of the metallic substrate.

Paralleling this development of the metallic supported catalyst system for automotive use, was the development of high temperature oxidation resistant metals useful in nuclear reactor systems. Certain Fe-Cr-Al systems were developed which gave favorable oxidation resistance due to the formation of a tenacious aluminum oxide (alumina) film thereon (see U.S. Pat. Nos. 3,027,252; 3,298,826; and 3,867,313). To increase the retention of the oxide film, yttrium was added to form an intermetallic phase with the iron promoting a tightly adhered oxide layer; unfortunately the yttrium additive adversely affects the cost of the process.

The Fe-Cr-Al alloy has been proposed for use as metallic substrate in catalytic systems. Although not the earliest use or proposal, U.S. Pat. No. 3,920,583 evidences such use of the substrate. The substrate is formed as a matrix for a catalytic system, containing up to 12% chromium, 0.5–12% aluminum and 0.1–3% yttrium, and the balance iron; it is subjected to heat in a flowing oxygen environment whereby the surface of the substrate becomes chemically active and is converted to an alumina coating, the alumina coating growing out of the metal itself; the heat treated substrate is then coated with a catalytic material such as platinum.

In spite of the advanced stage of both lines of development, there remains to date several significant problems that must be overcome for satisfactory commercial use of a metallic supported catalyst system in automotive vehicles. These problems comprise: (a) a need for even greater reduction in the resistance to flow of the matrix, (b) a need for a faster heat-up rate of the mass of the matrix and the catalytic material so as to become more quickly operative during start-up conditions, (c) improving the rigidity and bonding characteristics of the different parts of the matrix for an increased durability over longer periods of use, (d) the high cost of fabrication, and (e) a need for improving oxidation resistance of the substrate material without the necessity for using exotic materials such as yttria. The prior art to date has failed to produce a matrix material thin enough to provide a wall thickness that offers less resistance to flow. Because of the relative thickness of the matrix walls, the mass of the material remains relatively high for a given volume of a catalytic structure. Most of the commercially available catalyst systems have the substrate retained mechanically in place to maintain a predetermined configuration and thus can be considered unbonded or non-welded. This lack of rigidity has lead to a decrease in longevity of the device. The use of complicated chemical coating systems and treatment steps, as well as the use of expensive materials, has lead to very high fabrication costs. But the most critical barrier that must be overcome with respect to the wall sections, is the ability to roll the metallic substrate to a much finer gauge with ease while at the same time affording increased chemical protection against oxidation. The use of high chromium content steel alloys has limited such ability to roll to thin gauges because of the work hardening and embrittlement that takes place; an inordinate number of annealing cycles must be employed, requiring annealing between many successive reductions thereby increasing costs.

SUMMARY OF THE INVENTION

A primary object of this invention is to provide an improved method of making and using a catalytic system in automotive vehicles, which imparts greater economy of making, increased efficiency of use, without detrimentally affecting the durability and resistance to oxidation achieved by the prior art to date.

Another object of this invention is to provide an improved catalytic system for emission controls which has lowered resistance to flow and reduced matrix mass to effect an improvement in efficiency of operation.

Yet another object of this invention is to provide an improved mode of locking the elements of a catalytic system resulting in increased durability.

Features pursuant to the above objects comprise the use of: (a) a metallic supported catalyst system comprised of an iron-chromium-aluminum alloy to which is attached a catalyst of the platinoid group, (b) the metallic support is prepared by: rolling plain carbon steel (having a carbon content less than 0.80%) to a thickness of 0.0015-0.002 inches; cutting, folding and arranging said iron foil into a matrix providing a predetermined labyrinth of flow passages; immersing said matrix in a lead metal bath (at about 1100° C.) containing chromium and/or aluminum, said immersion being carried out for a period of 2-4 hours to effect diffusion of the chromium and/or aluminum into the iron foil at least uniformly throughout a depth of 0.001 inch and to effect bonding at contact points; removing said matrix from said bath, and heating to a temperature of about 1100° C. for a period from 1 to 5 hours so that the surface of the metallic support is altered to possess a chemically converted heat grown film of alumina. Thereafter, the matrix is sprayed with a wash coating of alumina and dipped to apply a platinum coating.

DETAILED DESCRIPTION

A preferred method for fabricating the catalyst system of this invention is as follows:

1. The metallic support or substrate is prepared by selecting a plain carbon steel conducive to cold rolling without annealing between successive rolling reductions. To this end, the plain carbon steel should have a carbon content less than 0.08 wt. %, and trace elements limited to no more than 0.5%. Typically this would comprise selecting a hot rolled band of steel having a thickness of approximately 2.2 mm, and preferably subjecting the steel to successive cold rolling operations to provide a foil housing a thickness preferably of 0.0015-0.002 inch and always less than 0.003 inches. The sheets of iron foil are then cut to a predetermined length and width designed for forming into a matrix which can nest within a selected catalyst housing. This can be carried out in a variety of modes. A preferred mode is to form a relatively long strip, corrugate the strip across its transverse dimension by imprinting accordian pleats or folds. The corrugated or pleated strip is sandwiched between flat (uncorrugated) sheets of the same material and wound in a spiral to form a honeycomb matrix. Upon completion of the spiral, a plurality of longitudinal passages are defined between the interleaved flat and corrugated strips, the passages being parallel and extending from one side of the assembly to the other. The passages preferably will have a general cross-sectional area of less than 0.005 in.$^2$.

2. The wound matrix is then subjected to a diffusion operation wherein the iron foil is through-alloyed and at the same time bonded at contact points between the corrugations and flat strips to form a locked assembly. To carry out this step, the matrix is immersed in a lead bath maintained at a temperature of about 1100° C. for a period of about 2-4 hours, the bath containing sufficient chromium and aluminum to effect diffusion of said elements into the iron foil. The content of the chromium and aluminum respectively in said bath is in the range of 0.05 and 1.0 wt %. The bath itself is comprised principally of lead because lead is incompatible with the iron matrix (will not dissolve thereinto) but will dissolve chromium and aluminum. Other bath ingredients may be selected if alloying elements other than chromium and aluminum are to be employed. Calcium and sodium have been employed and will operate to effect the alloy diffusion, but possess certain deficiencies.

The matrix is immersed in said bath so that, at the core of the foil, a chromium content of about 12-20% by weight is obtained and/or an aluminum content of 5-15% is obtained. At the surface, a chromium content of about 35% and/or an aluminum content of about 12% is obtained. It is preferable that a combination of 15% chromium and 6% aluminum be obtained at that region. An alloying gradient is obtained proceeding from the outermost surface to the innermost core of the foil, the innermost core containing the minimum predetermined chromium and aluminum content. Through alloying is obtained because the alloying diffusion depth is limited typically to about 0.001 inch, but since the distance from the outer surface of the foil to its center is no greater than 0.001 inch, there will be a complete alloy diffusion throughout the entire body of the iron foil.

Alloying diffusion takes place in a controlled manner, whereby metallic atoms of chromium and aluminum migrate and diffuse by replacing iron atoms in the foil. There is no distortion of the iron foil and minimal dimensional build up of a coating on the thickness of the foil, thus retaining the exact matrix configuration and shape as that which is presented to the lead bath. The iron and chromium, in diffusing into the metal substrate, creates a bridge across contact points between the corrugated foil and the flat foil sheet. Thus, bonding takes place throughout the entire matrix producing a rigid locked structure.

Upon completion of the immersion step, the iron substrate, forming said matrix, will be chemically constituted as follows: carbon 0.03% max., chromium 15-25%, aluminum 4-12%. Trace elements must be limited as follows: Manganese 0.2% max., silicon 0.2-0.5%, phosphorous 0.02% max., sulphur 0.02% max., nickel 0.3% max., oxygen 0.02% max., and nitrogen 0.02% max., the balance of course is iron.

If the diffused foil were subjected to physical property analysis, the tensile strength would be about 110,000 psi (760 Mp$_a$), the yield strength (at 4.2% offset) about 108,000 psi (745 Mp$_a$), the elongation about 1% and the hardness about 200 BHN. The density would be approximately 0.267 lbs per curic inch (7.4 g/cc) and its coefficient of thermal expansion would be (20° to 1000° C.) $7.6 \times 10^{-6}$ inch/inch/°F. ($13.7 \times 10^{-6}$ mm/mm/°C.), and the thermal conductivity of such material would be, at 500° C., about 16.5 BTU/hr/sq.ft.°F./ft.). Such substrate would be characterized further by a high resistance to oxidation and corrosion, such as a maximum weight gain of no greater than 4% on the substrate upon being exposed to an air atmosphere for about 100 hours at 1100° C.

3. The bonded and alloy diffused matrix is then subjected to a heating operation whereby the chemically active metal substrate is caused to form a grown film of alumina, locking the wash coating of alumina to the iron alloy. This is a heat grown film which forms alumina by migration of aluminum atoms within the iron foil to combine with the oxygen in the atmosphere and form additional alumina; this grown alumina is intimately seeded and locked between the wash coating of alumina and the base metal. This heating is carried out at a temperature of about 1100° C. for a period of about 1 to 5 hours.

4. The heat treated matrix is then provided with a wash coating of alumina (Al$_2$O$_3$) by being dipped in a slurry of such alumina, maintained at a temperature of about 600° C. Upon withdrawal of the dipped matrix, it is dried at conventional temperatures; the resulting wash coating will have a thickness in the range of 0.00025 to 0.003" and will have a number of pores therein which considerably extends the surface area of the matrix on a microlevel. The weight of the wash coating of alumina is typically in the range of 1 gram per cm.

5. The heat treated matrix is then coated with platinum by being dipped in a liquid salt solution containing platinum. The matrix is preferably submerged in a solution of platinum sulforesinate in an organic solvent. The amount of platinum in this solution is such that the quantity of platinum deposited on the matrix is 7.5 mg per DM. The platinum coated matrix is then withdrawn and allowed to drain and dry for about 1 hour at 100° C. The particles of platinum will impregnate the pores of the alumina wash coating so that the surface are a occupied by the platinum will be considerably greater than that if the platinum were directly applied to a flat cold rolled surface of fused iron foil.

6. The catalyst coated matrix is then placed in a suitable catalyst housing which will permit a flow of automotive emissions to be directed through the appropriate entrance side of the matrix passages. The housing may have a predetermined interior volume of less than 200 in.$^3$ and may be of the clam-shell type with a diameter ranging in size of 2-6", preferably about 3 inches. The catalytic device then is connected in the exhaust system on an automobile; the exhaust flow rate may be about 65 grams/ft$^3$. The expected gas emission temperature will be in the range of 600°-1000° C. and the product will heat up at a rate of at least 500° C. per minute to an operating temperature of about 500°-800° C., assuming the mass of the product is less than three pounds. The resulting catalyst system will be characterized by the existence of a diffused alloy bond between all contact points of the matrix and by the existence of an alloying gradient between the surface and core of the matrix walls.

I claim:

1. The method of making a catalyst system, comprising:
    (a) preparing a plain carbon steel foil having a thickness of 0.002 inches or less, the steel having a carbon content of 0.08% or less, said preparation being carried out with cold rolling and substantially reduced annealing;
    (b) forming said steel foil into a matrix defining a plurality of aligned passages;
    (c) immersing said steel foil matrix in a high heat transfer medium containing chromium and aluminum for a period of 2-4 hours at a temperature of about 1100° C., said chromium and aluminum atoms migrating and diffusing into the steel foil surface in exchange for iron atoms, said diffusion penetrating to the core of the foil;
    (d) subjecting said matrix to heated flowing air in the temperature range of about 1100° C. for a period of about 1-5 hours, whereby a thin alumina film is heat grown from the aluminum atoms within said metal substrate and oxygen in said flowing air;
    (e) coating the surfaces of the heat treated matrix with a refractory wash which is then dried to form a porous film on said surfaces;
    (f) depositing a catalytic ingredient onto the coating of said heat treated matrix for impregnation and coating thereof;
    (g) placing said coated and heat treated matrix in a suitable housing through which automotive exhaust gas emissions are passed, said gases having a temperature of about 600°-1000° C.

2. The method as in claim 1, in which said step (c) is carried out with successive immersion of said matrix in separate baths, one containing chromium and the other aluminum.

3. The method as in claim 1, in which said chromium and aluminum diffusion creates a chromium and aluminum gradient, the chromium gradient being constituted with at least 15% at the core of said foil and about 35% at the surface thereof, the aluminum gradient being constituted with about 4% at the core of said foil and about 12% at the surface thereof.

4. The method as in claim 1, in which in step (b) said matrix is formed by pleating a first sheet of said steel foil, winding said pleated sheet sandwiched by one or more uncorrugated sheets of steel foil to form a honeycomb matrix, the diffusion alloying serving to bond said sheets together at contact points by a bridge of diffused alloying ingredients.

5. The method as in claim 1, in which in step (e) the catalytic ingredient is platinum and is coated thereon by dipping said matrix in a platinum salt solution.

6. A catalytic system for automotive use, comprising:
   (a) a foraminous matrix defining a plurality of aligned micropassages each having a general cross sectional area less than 0.005 $in^2$, said matrix walls being constituted of an iron based chromium-aluminum foil having a thickness lless than 0.003 inch, at least two plys of said foil engaging at separated contact points to define said micropassages;
   (b) a chemically converted alumina coating along and on the surface of said matrix, which alumina is formed from aluminum atoms derived from said matrix metal upon exposure to flowing oxygen at high temperature;
   (c) means on said chemically converted alumina coating forming a highly porous refractory coating promoting increased surface area; and
   (d) a catalytic ingredient coated and impregnated onto said porous refractory coating, said system being particularly characterized by the existence of a diffused alloy bond between all contact points of said matrix and by the existence of an alloying gradient between the surface and core of said thin matrix walls.

7. A catalytic system as in claim 6, in which said porous refractory coating is comprised of alumina deposited as a wash in the thickness range of 0.00025–0.003″.

8. A method of making a catalyst system, comprising:
   (a) forming a plain carbon steel foil into a matrix defining a plurality of passages;
   (b) immersing said matrix in a high heat transfer medium containing one or more alloying elements for a period sufficient to permit diffusion of the alloying elements throughout the thickness of said foil;
   (c) removing said matrix from said medium and then heating to a temperature to oxidize at least one of the alloying elements to form an oxide coating on the surface of said matrix; and
   (d) coating said matrix with a porous refractory film containing a catalytic ingredient.

9. The method as in claim 8, which additionally comprises heating the coated matrix resulting from step (d) to fuse said coatings and matrix together.

10. The method as in claim 9, in which said last heating is carried out in service on an automobile by use of heated exhaust gases from the automobile engine.

* * * * *